United States Patent [19]

Stoye

[11] Patent Number: 5,767,844

[45] Date of Patent: Jun. 16, 1998

[54] MODIFIED UNIVERSAL SERIAL BUS INTERFACE IMPLEMENTING REMOTE POWER UP WHILE PERMITTING NORMAL REMOTE POWER DOWN

[75] Inventor: Donald A. Stoye, Santa Clara, Calif.

[73] Assignee: Sun Microsystems Inc., Palo Alto, Calif.

[21] Appl. No.: 608,705

[22] Filed: Feb. 29, 1996

[51] Int. Cl.[6] ............................................. G09G 5/00
[52] U.S. Cl. .................. 345/212; 345/168; 395/750.02; 364/189
[58] Field of Search ....................... 395/750.01, 750.02, 395/750.03, 750.04, 750.5, 750.06, 750.08; 341/22; 364/188, 189, 190, 707, 709.09, 709.11, 709.12, 709.13, 709.14; 345/156, 168, 211, 212

[56] References Cited

U.S. PATENT DOCUMENTS

| | | | |
|---|---|---|---|
| 5,214,785 | 5/1993 | Fairweather | 364/707 |
| 5,347,167 | 9/1994 | Singh | 395/750.02 |
| 5,410,305 | 4/1995 | Barrus et al. | 345/168 |
| 5,530,878 | 6/1996 | Bauer et al. | 395/750.02 |
| 5,548,764 | 8/1996 | Duley et al. | 395/750.02 |
| 5,652,895 | 7/1997 | Poisner | 395/750.01 |
| 5,657,593 | 8/1997 | Murata | 395/750.02 |
| 5,675,813 | 10/1997 | Holmdahl | 395/750.02 |

*Primary Examiner*—Steven J. Saras
*Assistant Examiner*—Xu-Ming Wu

[57] ABSTRACT

A remote power key function is implemented between a remote input device having a power key and a host computer system using a four lead USB interface. Normal functioning of the USB interface and of the input device are not affected. An input device includes a remote logic circuit comprising a transistor, a diode, and a low voltage battery. The remote logic circuit and MPU receive a first input from the power key and battery and receives a second input from the host-computer provided power supply that is "1" if the host computer is powered-up, and is "0" otherwise. Remote logic circuit output is coupled to the D+ USB interface line, and MPU output is coupled to the D+ and D− interface lines. Clamping latch logic within the host computer has a first input that is the D+ line, and a second input that is the power supply "1" or "0" signal. Latch logic output is input to the latch input port of the host computer power supply. When the host computer is to be powered-down, the remote logic circuit first input causes the MPU to output a scan code recognized by the host computer as commanding a power-down condition.

20 Claims, 3 Drawing Sheets

MODIFIED UNIVERSAL SERIAL BUS INTERFACE IMPLEMENTING REMOTE POWER UP WHILE PERMITTING NORMAL REMOTE POWER DOWN

FIELD OF THE INVENTION

This invention relates to computer systems that use a keyboard, mouse or other input device having a key to remotely power-up or power-down an associated computer system, and more specifically to interfaces between such systems and such input devices.

BACKGROUND OF THE INVENTION

FIG. 1 depicts a conventional computer system 10 as including a computer console unit 20 that typically contains a central processing unit ("CPU") 30, volatile random access memory storage 40 ("RAM"), persistent storage ("MEM") 50, and a power supply 60. Power supply 60 receives source AC voltage via an ON/OFF switch 70, and can receive a remote switch closure or opening signal at a latch-input signal port 80. When system 10 is powered-up by turning on switch 70 (assuming no power-down signal is present at port 80), power supply 60 outputs regulated DC voltages from an internal port 90. Commonly, a low voltage potential (e.g., +5 VDC) is coupled to a lead on a serial port 100 to power devices coupled to the serial port.

As shown, system 10 includes a monitor 110 and a modified serial cable 120 to which may be attached various input devices such as a keyboard 130 and/or a mouse device 140. It is known in the art to provide such input devices with a momentary push-type switch 150 that permits remote power-up or power-down of console 20 from the keyboard and/or mouse via cable 120 and power supply latch port 80. Keyboard 130 further includes a microprocessor unit 170 that outputs various scan codes over modified serial cable 120 when various of the normal keyboard keys (e.g., keys other than power key 150) are depressed by a user.

Thus, switch 70 permits a user in proximity to console 20 to manually turn power supply 60 on or off, while a special power key 150 permits the user to remotely power-up, power-down system 10. Although this remote power-up/power-down feature can be convenient, unfortunately implementing a remote power key function requires modification to serial port 100. Specifically, in addition to providing the four leads required in a standard serial port (DC power, ground, data signal, clock signal), serial port 100 must now also include a dedicated power line, 160. This additional line 160 carries an opening/closure from power key 150 to the latch port 80 in the system 10 power supply 60. Although power line 160 may physically be bundled within the wire group that includes the four standard serial wires, nonetheless a fifth line must be present.

One soon to be adopted new standard interface is the so-called universal serial bus ("USB") interface. The USB interface defines four leads, and does not provide a dedicated signal line that may be used to implement a remote power-up/power-down function as has been described.

There is a need for a mechanism allowing the USB interface to be used to implement a remote power key function permitting a remote power-up of a powered-down computer system, without requiring additional leads, and without substantial modification to the interface. Further, such mechanism should not impair a normal remote power-down of a powered-up computer system.

The present invention provides such a modification to the USB interface.

SUMMARY OF THE PRESENT INVENTION

The present invention implements a remote power key function between a remote input device and a host computer system, using a four lead universal serial bus ("USB") interface. This additional function is provided without requiring an additional dedicated power lead and without affecting normal functions of the remote input device.

The present invention provides an input device such as a keyboard, mouse, etc. with a remote logic circuit, and also provides the host computer system with a clamping latch logic circuit. Use of the power key permits a remote power-up of a computer system that is powered-down, while still permitting remote power-down of the powered-up computer system to occur as in the prior art. Of course normal remote device functions are not affected in that the keyboard and/or pointing device function normally.

Located with the input device, the remote logic circuit comprises a transistor, a diode, and a low voltage (e.g., ≈3 VDC or so) battery or equivalent power source that is independent of the host-computer provided power. The remote logic circuit receives a first input signal from the power key and battery (which first input signal also is coupled to the input device MPU). The first input signal can exist independently of whether the host computer is presently powered-up. The remote logic circuit also receives a second input signal from the host-computer power supply. The second input signal is logical "1" if the host computer power supply is powered-up, and is "0" otherwise. The output of the remote logic circuit is preferably coupled to the positive differential ("D+") USB interface line. Output signals from the MPU preferably are coupled to the USB D+ and D– interface lines. Located within the host computer, the clamping latch logic has a first input that is the D+ line, and a second input that is the "1" or "0" power supply level that was the second input to the remote logic circuit.

The output from the clamping latch logic is input to the latch input port of the host computer power supply. When remote power-up is commanded from the power-key, the clamping latch logic pulls the latch input port of the host computer power supply to logical "0". This "0" level causes the power supply to latch-on, thus powering-up the host computer.

When remotely powering-up a powered-down host computer, the remote logic circuit will output the first input signal, e.g., a positive pulse, when the power key is depressed; the second input signal being "0". The first input signal is also coupled to the input device MPU, but has no effect as the MPU is not presently receiving operating voltage due to the power-down state of the host computer power supply. The remote logic circuit output signal preferably is carried over the USB interface D+ line as the first input to the clamping latch logic circuit. This first input causes the clamping latch logic circuit to output a signal to the power supply latch input that powers-up the power supply, and thus powers-up the host computer system.

Assume now that the host computer is powered-up, and that remote power-down is desired. Within the remote logic circuit, the second input signal is "1", since the host computer power supply is outputting voltage, and the MPU is now receiving operating voltage. Under this condition, the remote logic circuit does not output a signal until the power key is momentarily depressed to provide a momentary "high" first input to the remote logic circuit. In response to the momentary "high" first input signal, the MPU outputs a scan code over the D+ and D– lines that is recognized by the host computer as commanding a power-down state. The host computer then causes its power supply to latch into a power-down state. Thus, a normal remotely-commanded power-down of the host computer can occur, without disruption resulting from implementation of the present invention.

Other features and advantages of the invention will appear from the following description in which a preferred embodiment has been set forth in detail in conjunction with the accompanying drawings.

DETAILED DESCRIPTION OF THE PREFERRED EMBODIMENT

As described below, the present invention adds a remote power-up function capability to an existing four-lead computer system serial bus, without affecting normal functionality of remote input devices coupled to the computer system via the bus, or normal remote power-down.

Figure 2:
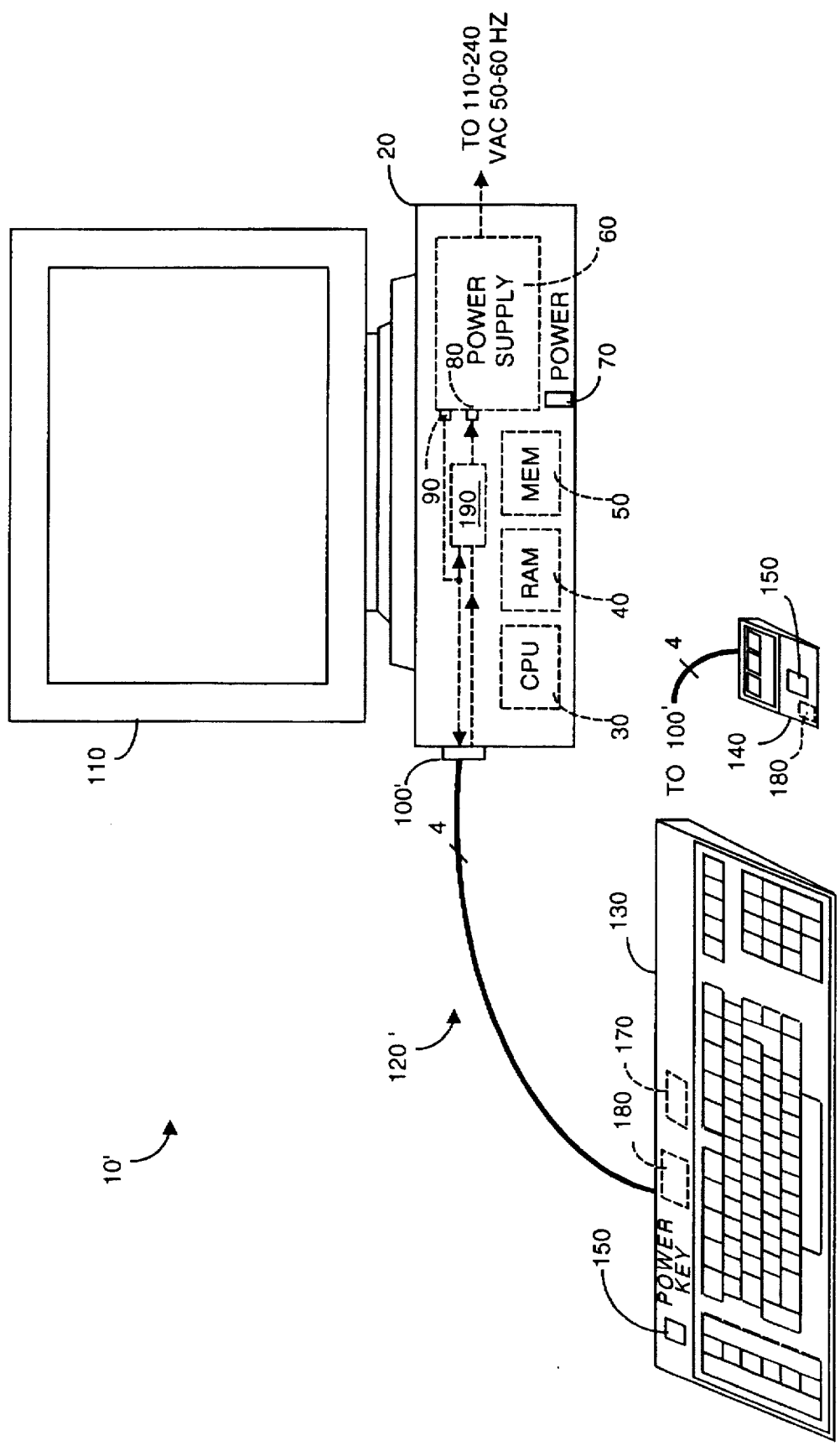
FIG. 2 depicts a computer system with remote power key power-up/power-down capability, using a four-lead universal serial bus interface, according to the present invention.

FIG. 2 depicts the present invention as including a remote logic unit 180 disposed within an input device such as a keyboard 130 or mouse 140, and a clamping latch logic unit 190 preferably disposed within console 20 of a host computer system 10' with which device 130 is to be used. Computer system 10' includes a universal serial bus ("USB") interface and associated USB port 100', whose four signals are carried by the four leads of USB cable 120'. With respect to FIG. 2, when power key 150 is momentarily depressed, the present invention permits computer system 10' to power-up if presently powered-down. Remote power key-commanded power-down of a presently powered-up computer system 10' is permitted to occur in the same fashion as in the prior art. Of course the keyboard 130 functions in normal fashion to input data by pressing keyboard keys, and, if present, pointing device 140 also functions in normal fashion.

Figure 1:
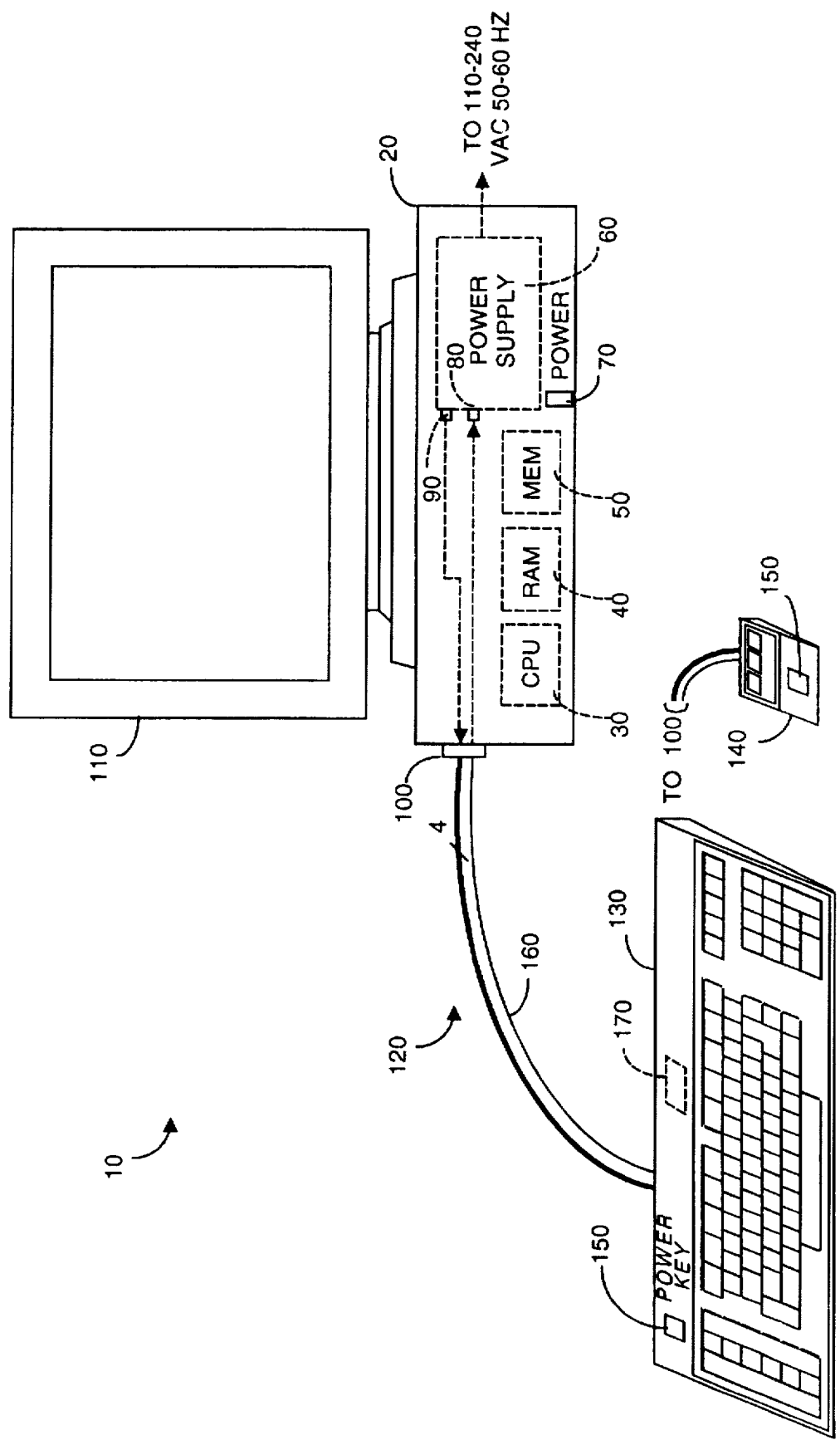
FIG. 1 depicts a computer system with remote power key power-up/power-down capability, using a dedicated fifth power line, according to the prior art.

It will be appreciated from a comparison with FIG. 1 that applicant's remote power key capability is implemented without requiring a fifth lead in the serial cable coupling the host computer to the remote input device. (Unless otherwise indicated, element numerals in FIG. 2 or FIG. 3 that are identical to numerals in FIG. 1 represent the same elements described with respect to FIG. 1.)

Figure 3:
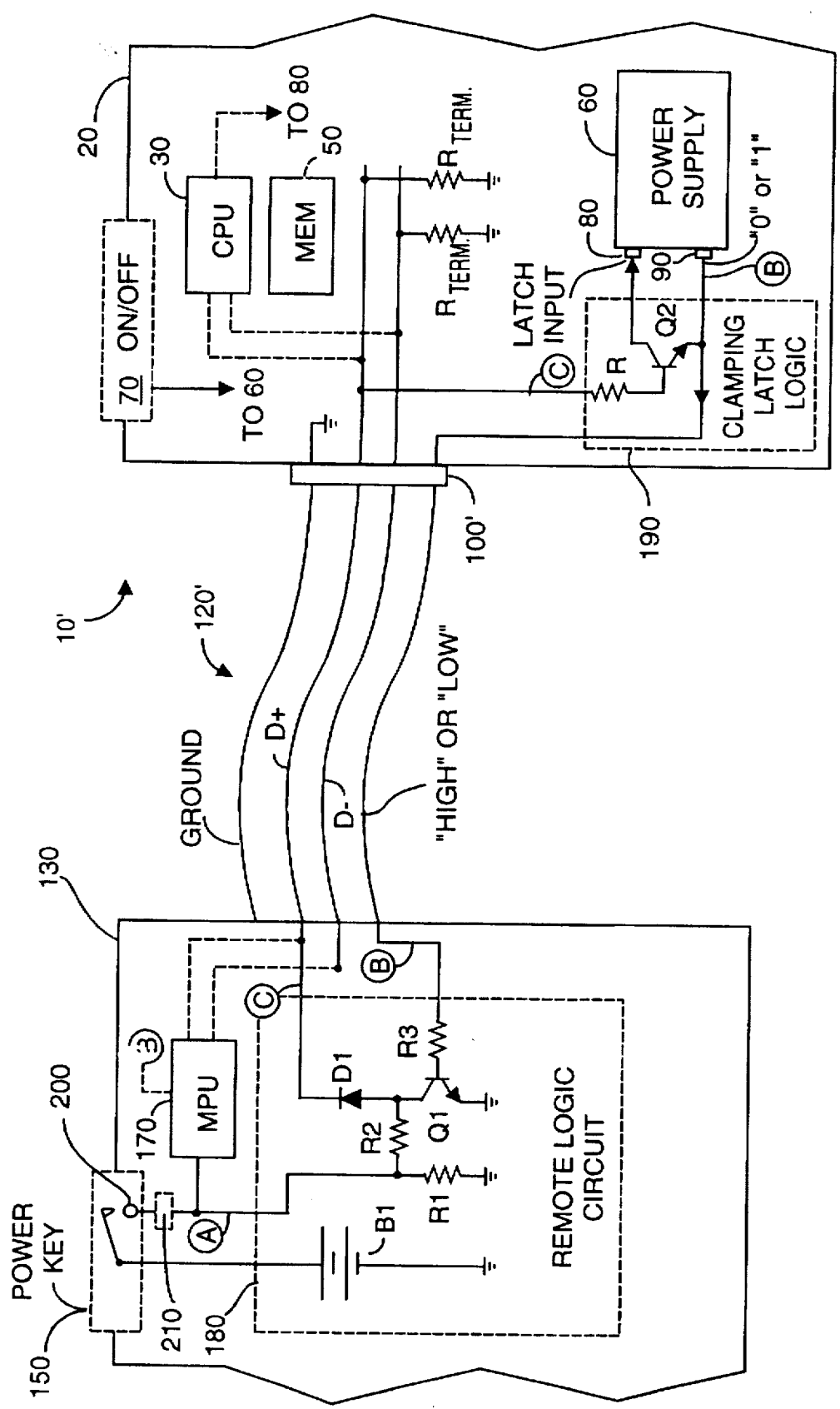
FIG. 3 depicts a preferred implementation of the present invention.

FIG. 3 is a schematic of a preferred embodiment of the present invention. The lefthand portion of FIG. 3 depicts input device 130 as including a microprocessor unit 170, a power key switch 150, and remote logic circuit 180. Although the input device preferably will be a computer keyboard equipped with a power key 150, a mouse, trackball or other device 140 may also include the present invention. The righthand portion of FIG. 3 depicts computer console unit 20 of computer system 10' as including, among other components, power supply 60, on/off switch 70, clamping latch circuit 190, and preferably a USB interface and USB serial port connector 100'. Coupling between computer system 10' and input device 120 is via a standard four-wire USB connector 120. Computer system 10' in FIGS. 2 and 3 may be identical to computer system 10 in FIG. 1 except that system 10' only requires a four-wire bus 120' and also includes the clamping latch logic 190. However, in some computer systems 10', the equivalent of clamping latch logic 190 may already be incorporated within power supply 60.

Under the USB standard, four signals are present: a power signal that is +5 VDC when power supply 60 is powered-up and is ground otherwise, a ground connection, and a pair of differential data leads, denoted D+, D−. The differential data signals are complementary to each other, and each have a magnitude varying from about 0 VDC to about +3.3 VDC. Within input device 130, the D+, D− leads are normally coupled to outputs of MPU 170 and can carry scan codes output by the MPU, for example in response to pressing one or more keys on a computer keyboard when typing.

Logic circuit 180 within input device 130 receives a first input signal from the power key 150 upon closure (waveform A), and receives a second input signal from port 90 of host computer power supply 60 (waveform B). As noted, waveform B is "1" if host computer power supply 60 is powered-up and is "0" otherwise. In response to these waveform A, waveform B signal states, logic circuit 180 outputs a signal (waveform C) that preferably is carried over the D+ line in serial USB cable 120' to the host computer. Further, if powered-up, MPU 170 can out-put scan codes over cable 120' in a normal fashion.

Logic circuit 180 preferably is powered by a low voltage battery B1 (e.g., ≈3 VDC), or another low voltage power source that is independent of power supply 60. For example, power key switch 150 could be provided with a piezoelectric device 200 that upon being compressed by power key switch closure, outputs voltage pulses. In this embodiment, battery B1 would be eliminated. Such piezoelectric-generated pulses would be coupled to a signal conditioning circuit 210 for any required pulse width alteration and amplitude scaling. The output from signal conditioning circuit 210 would be a logic level pulse, similar in magnitude to what would be provided if battery B1 were still present. This conditioned pulse would then be coupled to power logic circuit 180 and to MPU 170. Regardless of whether a battery, a piezoelectric device, or other implementation is used, the power source for logic circuit 180 must be independent of the state of the host computer power supply 60. This independence permits logic circuit 180 to remotely power-on power supply 60 when the power supply is powered-down.

Preferably logic circuit 180 includes a solid state switch, e.g., transistor Q, whose collector preferably is coupled to the D+ data line through a diode D. A resistor pair R1, R2 serves to limit any Q1 forward current flow through D1 into the D+ line. A base resistor R3 prevents waveform B from being pulled down to about +0.7 VDC by the emitter-base junction of Q1 when waveform B is "high". The magnitude of resistors is not critical and may be in the 10 KΩ to 100 KΩ range if Q1 is a bipolar transistor, and higher if Q1 is a metal-oxide-semiconductor ("MOS") device.

Within host computer system 10', clamping latch logic 190 receives as a first input the D+ signal carried by cable 120', and receives as a second input the +5 VDC (logical "1" or "high") or 0 VDC (logical "0" or "low") signal present at power supply port 90. The output of clamping latch circuit 190 is coupled to the latch input port 80 of power supply 60. Preferably clamping latch logic 190 comprises a transistor Q2 and a current limiting resistor R, coupled as shown in FIG. 3.

Assume first that power supply 60 in system 10' is powered-down, which means that power supply port 90

(e.g., waveform B) is at ground potential. Until such time as power key 150 may be depressed, logic output waveform C floats, as no operating potential is present. However, momentarily pressing power key 150 couples a positive voltage from power source B1 through R2 and into the D+ line. This positive waveform C is carried by serial cable 120' as a first input signal to clamping latch logic 190. This positive signal is also coupled to MPU 170. However because MPU 170 is not presently receiving operating voltage (since power supply 60 is not yet powered-on), MPU 170 does not respond.

The second input signal to clamping latch logic 190 is waveform B, which is ground since power supply 60 is presently powered-down. However, arrival of the B1-power key-created positive pulse waveform C turns-on latch transistor Q2, which pulls "low" the level at latch input port 80 on power supply 60. This "low" state latches-on power supply 60 in a conventional manner. Computer system 10' is now said to be powered-up.

Consider now the case when computer system 10' is powered-up, but it is desired to power-down remotely using the power key 150 on the keyboard 130, or mouse 140. Because power-up exists, waveform B will be "high" and within logic circuit 180, transistor Q1 is turned on. It will be appreciated that the presence of diode D1 prevents the D+ signal line from being pulled to near ground by Q1.

Assume now that power key 150 is momentarily depressed. A positive signal, waveform A, is coupled as a first input signal to logic circuit 180, and is also coupled as an input to MPU 170, which is already receiving operating power (waveform B) from host power supply 60. Current from B1 is conducted through R2, through Q1 to ground, and does not forward bias D1. However, the positive waveform A signal coupled to MPU 170 causes MPU 170 to output a scan code over D+, D– that is recognized by CPU 30 and software or firmware within system 10' as commanding a power-down state. Such software may be stored within memory 50, or may be implemented as read-only-memory ("ROM"), which may be associated with memory 50, or may be implemented as firmware within system 10'. In any event, upon recognition of this scan code CPU 30 within host computer system 10' will issue a logic signal to latch input 80 of power supply 60, commanding power-down. As such, remotely-commanded power-down may occur as in the prior art, without impairment from the present invention.

Although the preferred embodiment of FIG. 3 has been described, those skilled in the art will recognize that the logic functions associated with logic unit 130 and with clamping latch logic 190 may be implemented in other ways. For example, logic unit 130 may be implemented with one or more MOS devices, and/or with a piezoelectric device that replaces battery B1. Clamping latch logic unit 190 may be embedded into the design of power supply 60, or may be implemented with other than a bipolar transistor. Further, for purposes of this invention, the output signal (waveform C, from remote logic circuit 180 may be carried over the D– line rather than over the D+ line.

Modifications and variations may be made to the disclosed embodiments without departing from the subject and spirit of the invention as defined by the following claims.

What is claimed is:

1. A method of remotely powering-up a computer system that has a power supply from an input device having a power key, said input device being coupled to said computer system through a port having less than five leads, said leads including a data signal lead and a voltage lead carrying a voltage from said power supply that is in a first logic state when said power supply is powered-up and that is in a complementary logic state otherwise, the method comprising the following steps:

(a) causing activation of said power key to create a pulse regardless of whether said power supply is powered-up; and (b) coupling said pulse over said data signal lead to said computer and to a latch input port of said power supply if said power supply is powered-down, but not coupling said pulse over said data signal lead otherwise;

wherein when said power supply is powered-down, activating said power key couples said pulse to said data signal lead to said latch input of said power supply causing said power supply to latchingly enter a power-up state.

2. The method of claim 1, wherein step (a) and step (b) collectively include:

providing said input device with a logic unit that causes activation of said power key to create said pulse, said input device having a first input coupled to receive said pulse, and having a second input coupled to said voltage lead, and coupling an output of said logic unit to said data signal lead;

said output of said logic unit being in said first state when said power supply is powered-down, and being in said complementary state otherwise; and wherein when said power supply is powered-down, activating said power key couples said pulse to said first input of said logic unit, said logic unit in response to said second input being in said complementary state outputting a first logic level signal that causes said power supply to latchingly enter a power-up state.

3. The method of claim 1, wherein when said power supply is powered-up, said first logic state that is present on said voltage lead coupled to said second input of said logic unit blocks coupling of said pulse to said data signal lead.

4. The method of claim 1, wherein:

said remote logic unit further includes a microprocessor unit (MPU) coupled to and operable from said voltage on said voltage lead, said MPU being coupled to receive as an input said pulse generated upon activation of said power key;

when said power supply is powered-up, activating said power key couples said pulse to said MPU, said MPU outputting a scan code over at least said signal line, said scan code being recognized by said computer system CPU as commanding a power-down state, said CPU coupling a signal to said power supply causing said power supply to power-down.

5. The method of claim 1, wherein said port is a four-lead universal serial bus (USB) consisting of said voltage lead, a ground lead, said data supply lead, and a complementary data supply lead.

6. The method of claim 2, wherein said logic unit is powered from a source selected from the group consisting of (a) a battery, and (b) a piezoelectric device.

7. The method of claim 2, wherein said input device is selected from the group consisting of (a) a computer keyboard, and (b) a pointing device.

8. An input device coupleable, via a four-wire universal serial bus (USB) having a power lead and a ground lead and first and second complementary data signal leads, to a computer system having a power supply latchably switchable between a power-up state and a power-down state and vice versa, said power supply providing at least a voltage that is in a first logic state when said power supply is powered-up and that is in a complementary logic state otherwise, the input device including:

a power key, switchably coupled to a power source operable even when said power supply is powered-down such that activation of said power key outputs a pulse to cause said power supply to change power states; and a logic unit having a first input coupled to said pulse, having a second input coupled via said power lead to said voltage from said power supply, and having an output coupled to a chosen one of said complementary data signal leads;

wherein when said power supply is powered-down, activation of said power key creates said pulse, which is carried by said USB to said power supply and causes said power supply to latchingly power-up.

9. The input device of claim 8, wherein said power key is user-operable from a surface of said input device, and wherein said input device is selected from the group consisting of (i) a keyboard, and (ii) a pointing device.

10. The input device of claim 8, wherein said logic unit is powered from a source selected from the group consisting of (a) a battery, and (b) a piezoelectric device.

11. The input device of claim 8, wherein said logic unit includes a solid state switch device having a first node coupled to said pulse, a second node coupled to said power lead, and a third node coupled to a chosen one of said data leads.

12. The input device of claim 8, further including a microprocessor unit (MPU) coupled to receive said pulse and coupled to said power lead to receive operating voltage and having outputs coupled to said complementary data signal leads, said MPU outputting a first scan code if said power key is activated when said power supply is powered-up;

wherein when said power supply is powered-up, activating said power key creates said pulse causing said MPU to output said first scan code over said data leads, said computer system recognizing said first scan code as a power-down command and issuing a signal to said power supply causing power-down of said power supply;

wherein when said power supply is powered-down, said MPU receives no operating voltage from said power lead and activation of said power key does not result in MPU generation of said first scan code.

13. A remotely power-commanded computer system including an input device having a microprocessor unit (MPU) and a power key, and a computer unit including a latchable power supply; the system comprising:

a four lead universal serial bus (USB) connecting said input device and said computing system, said bus including a ground lead, a power lead that carries a first logical signal level when said power supply is powered-up and that carries a complementary logical signal level otherwise, and that carries first and second complementary data signal leads;

said power key coupled to provide a pulse when activated, regardless of whether said power supply is powered-up;

said MPU being coupled to said power lead to receive operating potential, having an input coupled to said pulse, and having outputs coupled to said first and second complementary data signal lines;

a logic unit having a first input node coupled to said pulse, having a second input node coupled to said power lead, and having an output coupled to a chosen one of said data signal leads;

wherein if said power supply is powered-down, activating said power key provides said pulse, which is carried by said USB to said power supply and causes said power supply to latchingly power-up; and wherein when said power supply is powered-up, activating said power key creates said first pulse, which causes said MPU to output a first scan code over said data lines, said computer system recognizing said first scan code as a command to power-down said power supply and issuing a signal to said power supply latchingly causing power-down.

14. The system of claim 13, wherein said logic unit is disposed in said input device, said power key is user-operable from a surface of said input device, and said input device is selected from the group consisting of (a) a computer keyboard, and (b) a pointing device.

15. The system of claim 13, wherein said logic unit is powered from a source selected from the group consisting of (a) a battery, and (b) a piezoelectric device.

16. The system of claim 13, wherein said logic unit includes a solid state switch having a first node coupled to said pulse, having a second node coupled to said power lead, and having an output node coupled to a chosen one of said data leads.

17. The system of claim 13, wherein said logic unit includes a bipolar transistor whose collector is said first node and is coupled to said output node, whose base is said second node input, and whose emitter is coupled to ground.

18. The system of claim 17, wherein said logic unit includes a diode series-coupled between said collector and said output of said logic unit;

said diode preventing coupling of said pulse to said chosen one of said data signal leads when said power supply is powered-up.

19. The system of claim 13, wherein said logic unit is powered by a battery.

20. The system of claim 13, further including a clamping latch logic circuit, disposed in said computer unit, said clamping latch logic circuit comprising:

a solid state switch having a first input coupled to receive said output of said logic unit via said chosen one of said data leads, having a second input coupled to said power lead, and having an output lead coupled to a latch input port of said power supply.

\* \* \* \* \*

UNITED STATES PATENT AND TRADEMARK OFFICE
CERTIFICATE OF CORRECTION

PATENT NO. : 5,767,844.
DATED : June 16, 1998
INVENTOR(S) : STOYE

It is certified that error appears in the above-indentified patent and that said Letters Patent is hereby corrected as shown below:

On the cover page under [56] References Cited, U.S. PATENT DOCUMENTS, delete "5,657,593" and insert therefore --5,654,593--

Column 4, line 48, immediately following "Q" insert --1--

Signed and Sealed this

Fifteenth Day of September, 1998

Attest:

BRUCE LEHMAN

*Attesting Officer*      *Commissioner of Patents and Trademarks*